United States Patent
Kadoi et al.

(10) Patent No.: US 7,444,208 B2
(45) Date of Patent: Oct. 28, 2008

(54) ELECTRICAL SYSTEM WIRING DIAGRAM GENERATING SYSTEM, AND POWER SUPPLY DEVICE AND PROGRAM USED FOR THE SAME

(75) Inventors: Hirokazu Kadoi, Tokyo (JP); Fujitaka Togashi, Tokyo (JP); Akinori Miyazaki, Tokyo (JP); Kazuhiko Takano, Tokyo (JP)

(73) Assignee: Densei-Lambda K.K. (JP)

( * ) Notice: Subject to any disclaimer, the term of this patent is extended or adjusted under 35 U.S.C. 154(b) by 587 days.

(21) Appl. No.: 10/399,212

(22) PCT Filed: Sep. 10, 2001

(86) PCT No.: PCT/JP01/07848

§ 371 (c)(1),
(2), (4) Date: Apr. 14, 2003

(87) PCT Pub. No.: WO03/023938

PCT Pub. Date: Mar. 20, 2003

(65) Prior Publication Data

US 2004/0015340 A1    Jan. 22, 2004

(51) Int. Cl.
G05B 15/02 (2006.01)
G05B 11/01 (2006.01)
G06F 17/40 (2006.01)
G06F 17/50 (2006.01)
G01R 21/00 (2006.01)
G01R 21/127 (2006.01)
G01R 21/133 (2006.01)

(52) U.S. Cl. ............ 700/286; 700/22; 703/18; 702/60; 702/61; 702/62

(58) Field of Classification Search ............ 703/4, 703/18; 702/60–62; 379/102.03, 104, 23–25, 379/106.03, 106.04; 700/276, 286, 22
See application file for complete search history.

(56) References Cited

U.S. PATENT DOCUMENTS 4,467,314 A * 8/1984 Weikel et al. ............... 700/295

(Continued)

FOREIGN PATENT DOCUMENTS

EP    1306959 A2 *  5/2003

(Continued)

OTHER PUBLICATIONS

XP002180281, Anonymous: A software managing clustered multi vender uninterruptible power supply on network—Mar. 1, 1999, Research Disclosure, Mason Publications, Hampshire GB, pp. 1-6, ISSN: 0374-4353.

(Continued)

*Primary Examiner*—Kamini Shah
*Assistant Examiner*—Akash Saxena
(74) *Attorney, Agent, or Firm*—Stephen Chin; von Simson & Chin (57) ABSTRACT

Each of connection data 11, . . . , or 15, of the downstream side of a socket 1, . . . , or 5 or a panel board 6, 7, or 8 in a power supply direction, is generated in a tap 16, a UPS 25 and 35, or a terminal 24 or 34, and each of the connection data is transmitted to a electrical system wiring diagram generating terminal 36. Then, a wiring diagram is generated, based on connecting information 91 of the upstream side, which is registered in the generating terminal 36, and the plural connection data of the downstream sides.

8 Claims, 6 Drawing Sheets

U.S. PATENT DOCUMENTS

| | | | | |
|---|---|---|---|---|
| 4,703,306 | A | * | 10/1987 | Barritt .................. 340/310.18 |
| 4,899,217 | A | | 2/1990 | MacFadyen et al. |
| 5,038,294 | A | * | 8/1991 | Arakawa et al. .............. 716/12 |
| 5,061,916 | A | * | 10/1991 | French et al. ............... 340/522 |
| 5,170,935 | A | * | 12/1992 | Federspiel et al. ........ 236/44 C |
| 5,179,376 | A | * | 1/1993 | Pomatto ............... 340/870.02 |
| 5,218,552 | A | * | 6/1993 | Stirk et al. .................. 700/286 |
| 5,381,554 | A | | 1/1995 | Langer et al. |
| 5,471,190 | A | * | 11/1995 | Zimmermann ........ 340/310.11 |
| 5,519,878 | A | * | 5/1996 | Dolin, Jr. .................... 709/220 |
| 5,528,507 | A | * | 6/1996 | McNamara et al. ......... 700/286 |
| 5,684,710 | A | * | 11/1997 | Ehlers et al. ................ 700/293 |
| 5,852,564 | A | * | 12/1998 | King et al. .................... 703/14 |
| 5,933,073 | A | * | 8/1999 | Shuey ........................ 375/258 |
| 5,949,974 | A | | 9/1999 | Ewing et al. |
| 5,980,078 | A | * | 11/1999 | Krivoshein et al. ............. 700/1 |
| 5,987,458 | A | * | 11/1999 | Anderson et al. ............... 707/6 |
| 6,321,187 | B1 | * | 11/2001 | Squier et al. .................. 703/18 |
| 6,472,770 | B1 | * | 10/2002 | Pohjola ..................... 307/10.1 |
| 6,480,889 | B1 | * | 11/2002 | Saito et al. .................... 709/220 |
| 6,606,731 | B1 | * | 8/2003 | Baum et al. ..................... 716/3 |
| 6,759,946 | B2 | * | 7/2004 | Sahinoglu et al. ...... 340/310.11 |
| 6,925,429 | B2 | * | 8/2005 | Iimori ........................ 703/14 |
| 6,940,956 | B1 | * | 9/2005 | Leach .................. 379/106.01 |
| 6,993,417 | B2 | * | 1/2006 | Osann, Jr. .................... 700/291 |
| 7,058,481 | B2 | * | 6/2006 | Jiang et al. .................. 700/286 |
| 7,188,003 | B2 | * | 3/2007 | Ransom et al. ............. 700/286 |
| 2001/0034754 | A1 | * | 10/2001 | Elwahab et al. ............. 709/201 |
| 2002/0101695 | A1 | * | 8/2002 | Saksa .......................... 361/64 |
| 2003/0050737 | A1 | * | 3/2003 | Osann, Jr. .................... 700/276 |
| 2003/0063723 | A1 | * | 4/2003 | Booth et al. ........... 379/106.03 |
| 2003/0085624 | A1 | * | 5/2003 | Kadoi et al. .................... 307/64 |
| 2003/0200010 | A1 | * | 10/2003 | Chiang et al. ............... 700/286 |
| 2003/0229423 | A1 | * | 12/2003 | Andarawis et al. .......... 700/286 |
| 2004/0015340 | A1 | * | 1/2004 | Kadoi et al. .................. 703/18 |
| 2004/0162642 | A1 | * | 8/2004 | Gasper et al. ................ 700/286 |
| 2005/0212526 | A1 | * | 9/2005 | Blades ........................ 324/543 |
| 2006/0023853 | A1 | * | 2/2006 | Shelley et al. .......... 379/106.03 |
| 2006/0116794 | A1 | * | 6/2006 | Stoupis et al. ............... 700/286 |
| 2006/0129281 | A1 | * | 6/2006 | Cargnelli et al. ............. 700/292 |

FOREIGN PATENT DOCUMENTS

| | | |
|---|---|---|
| JP | 2050632 | 2/1990 |
| JP | 8079139 | 3/1996 |
| JP | 9-224336 A | 8/1997 |
| JP | 10-275124 | 10/1998 |
| JP | 2000236606 A * | 2/1999 |
| JP | 2001-159934 | 6/1999 |
| JP | 11-272589 | 10/1999 |
| JP | 11-272589 A | 10/1999 |
| JP | 11-305881 | 11/1999 |
| WO | WO 98/55934 | 12/1998 |
| WO | WO 00/33098 | 1/2000 |
| WO | WO 01/82260 | 11/2001 |

OTHER PUBLICATIONS

XP004304645, Jarkowski M., et al. "New approach for management services with a web browser", Nov. 10, 1999, Computer Networks, Elsevier Science Publishers B.V., Amsterdam, NL, pp. 2227-2236, ISSN; 1389-1286.

XP008054694, Fushima T. et al., Power management software, "LanSafe III" Sanken Technical Report, Sanken Electric Company, Japan, vol. 30, No. 1 Nov. 1998—pp. 40-47, ISSN: 0285-9815.

XP008054695, Iwata T. et al. , Power Supply management software "Fullback manager pro" Sanken Technical Report Sanken Electric Co., Japan, vol. 32, No. 1, 2000 pp. 75-80, ISSN: 0285-9815.

XP008054691, Ishikawa T. et al., "Fullback series new option fullbacknet series for network applications", Sanken Technical Report, Sanken Electric Co., Japan, vol. 29, Nov. 1, 1997 (1997-11), pp. 84-93, ISSN: 0285-9815.

* cited by examiner

ELECTRICAL SYSTEM WIRING DIAGRAM GENERATING SYSTEM, AND POWER SUPPLY DEVICE AND PROGRAM USED FOR THE SAME

TECHNICAL FIELD

The present invention relates to a electrical system wiring diagram generating system, which easily generates a wiring diagram of the power system in buildings, offices, houses, and the like, which can be suitably used, and also relates to a power supply device and a program used for the electrical system wiring diagram generating system.

BACKGROUND ART

Recently, so-called office automation has become advanced in buildings, offices, and the like. Therefore, many computer terminals are used in there, and they can transmit/receive data to/from each other via a communication network.

Further, computer terminals also have been spread in houses to use the Internet, besides so-called conventional house appliances such as refrigerators and audio visual devices had already been spread.

In such situations, for example, the following problems have arisen.

Electric power consumption in each office or each house increases, due to the increase of electric devices which consume electric power, and that makes it happen that the permissible current value is exceeded or that the breaker of the panel board operates.

Even if the breaker do not operate, the electric power becomes temporary unstable; an instantaneous power failure occurs locally; and, as a result, these states may make data in the computer terminals disappear. Particularly, in case such an instantaneous power failure or the like occurs to a communication relay device, such as a hub, a router, or a communication network server of the communication network, there arises communication problem.

In case such communication abnormality is occurred, originally caused by the power supply abnormality, generally, the hardware, the software and the like, which constitute the communication network, are analyzed first, and then, after thoroughly analyzing these factors, the original cause is understood to be the power supply abnormality. Especially in case of the instantaneous power failure or the like, since the abnormal state of the power supply disappears immediately, it is very rare case to find out the original cause is the power supply abnormality. Thus in most cases, it is found out that the original cause of the communication problem is the power supply abnormality, after the communication problem has occurred repeatedly; and it takes long time and large man-hours to find out the origin cause and to solve the problem.

Incidentally, it is very important to understand the state of the power system, from the main panel board to each of the electric devices, for constructing a power system as to operate the communication network normally, even in the power system abnormality and in the power supply abnormality.

However, in many cases of rental offices and houses, it is very difficult to understand the electric power distribution flow, from the main panel board to the wall sockets.

In addition, since there are usually electric devices in use more than the sockets, it is ordinary to connect a tap to the wall socket, and to connect each of the electric devices to the tap. And whenever the shortage of the sockets occurs; each person in charge of the each section connects taps with each other, and connects the electric devices to the taps.

Therefore, in most cases in the offices and houses, it is almost impossible to draw a wiring diagram of the power system, from the main panel board to each of the electric devices, even if it is desired.

It is an object of the present invention to provide a electrical system wiring diagram generating system, capable of easily generating a wiring diagram of a power system even if the connections of electric devices to the power supply are changed in the power system, and a power supply device and a program used for the electrical system wiring diagram generating system.

DISCLOSURE OF THE INVENTION

In order to solve the aforesaid problems, a electrical system wiring diagram generating system according to the present invention is, for generating a wiring diagram of a power system related to plural electric devices, which are connected to a power supply via power supply equipments, such as panel boards, sockets, table taps, or uninterruptible power supplies, arranged in the power system, which comprises: plural downstream side connection data generating means, provided at least with every the sockets or at least with every the panel boards, and at most with every the power supply equipments to which the electric devices are directly connected, each of which generates connection data of downstream side of the power system between the selected power supply equipment, with which each of the downstream side connection data generating means is provided, and the electric devices connected thereto; plural transmitting means, each of which transmits the each of connection data of the downstream side of the power system, together with the identification information, which is uniquely allocated to each of the power supply equipments, of the selected power supply equipment; receiving means, for receiving the information transmitted from the plural transmitting means; an upstream side connection data generating means, for generating connection data, as the connection data of upstream side of the power system, of at least the power supply equipments, which does not exist in any of the connection data of the downstream side of the power system, associated with identification information, which is uniquely allocated to each of the power supply equipments, of each of the power supply equipments; and a wiring diagram generating means, which generates a wiring diagram of the power system, from the connection data of upstream side of the power system and plural the connection data of downstream side of the power systems, based on the identification information of the power supply equipments.

Applying this configuration, the wiring diagram of the power system can be easily generated. Further, even when connection of the electric device to the power supply are changed, or when a new electric device is added, a new wiring diagram of the power system can be easily generated, according to the change or addition.

For example, since connecting information of each of the electric devices in the power system can be locally registered, by the dividing unit of the socket or the panel board, just by registering the connecting information, with a downstream list generating means, as confirming, one by one at the location, the connecting state of each of the electric devices in the power supply system, the registration of each of the electric devices is done easily. On the other hand, since there is little possibility to change the connecting information of the panel board or the like, which is located in the upstream side of the power system, the registration of these power supply equipments is usually done at the installation time, with an upstream list generating means. Accordingly, the electrical system wiring diagram generating system generates a wiring diagram of the power system, according to the actual connection in the power system, just by being renewed the registered connecting information of the downstream side of the socket or the panel board, even though the whole connection of the power system is managed continuously.

As a result, it is easy to check the position, where electric power seems to become insufficient or the like, at the time when the connection of the electric devices is changed, or a new electric device is connected in the power system. Therefore, it is possible to analyze the trouble of the power supply system, prevent trouble and maintenance, enhance the power supply equipments properly according to the connection of the electric devices, and the like.

Further, it is easy to find out a router and the like, which is not backed up its power by an uninterruptible power supply, and to check the operating state of a communication network under an abnormal condition of the power supply, for example, with a reference to a communication network wiring diagram or the like, and that enables to operate the communication network, with minimizing the influence from the trouble of the power supply system.

The electrical system wiring diagram generating system according to the present invention further comprises: an evaluating means, for evaluating the power system, based on the connection relationship between the power supply equipments and the electric devices, which exist in the wiring diagram of the power system.

Applying this configuration, it is easy to understood a problem of the power system, at the time when the connection of the electric devices is changed, or a new electric device is connected in the power system.

The electrical system wiring diagram generating system according to the present invention further comprises: a trouble detecting means, for detecting trouble in the power system; and a display means, for displaying the wiring diagram of the power system and the position of the trouble having occurred.

Applying this configuration, it is easy to understand the original cause is in the power system, even when a communication network becomes in an abnormal state, due to the abnormal state of the power supply.

A power supply device according to the present invention is a power supply device, arranged in a power system between a power supply and electric devices, for supplying power supplied from the power supply to the electric devices, which comprises: a storage means, for storing identification information, which is uniquely allocated to the power supply device; a downstream side connection data generating means, for generating connection data of downstream side of the power system between the power supply device and the electric devices connected thereto; and a transmitting means, for transmitting the connection data of downstream side of the power system, together with the identification information.

A computer program product according to the present invention is a computer program product, which is executed in a computer, which is connected to a power supply via power supply equipments, such as panel boards, sockets, table taps, or uninterruptible power supplies, arranged in a power system, which comprises, being collaborated with a central processing unit of the computer: in collaboration with a central processing unit of the computer, a downstream side connection data generating means, for generating connection data of downstream side of the power system between the selected power supply equipment, to which the computer is directly connected, or which is connected on the upstream side of the power supply equipment to which the computer is directly connected, and electric devices connected thereto; and a transmitting means, for transmitting the connection data of the downstream side of the power system, together with the identification information, which is uniquely allocated to the selected power supply equipment.

BEST MODE FOR CARRYING OUT THE INVENTION

Hereinafter, a electrical system wiring diagram generating system, and a power supply device, and a program to be used for the same, according to an embodiment of the present invention, will be explained with reference to the drawings. It should be noted that, in the example, the power supply device is explained as an intelligent tap and an intelligent uninterruptible power supply in the system, and that the program is explained in a state of being installed in a computer as an intelligent terminal.

Embodiment 1.

Figure 1:
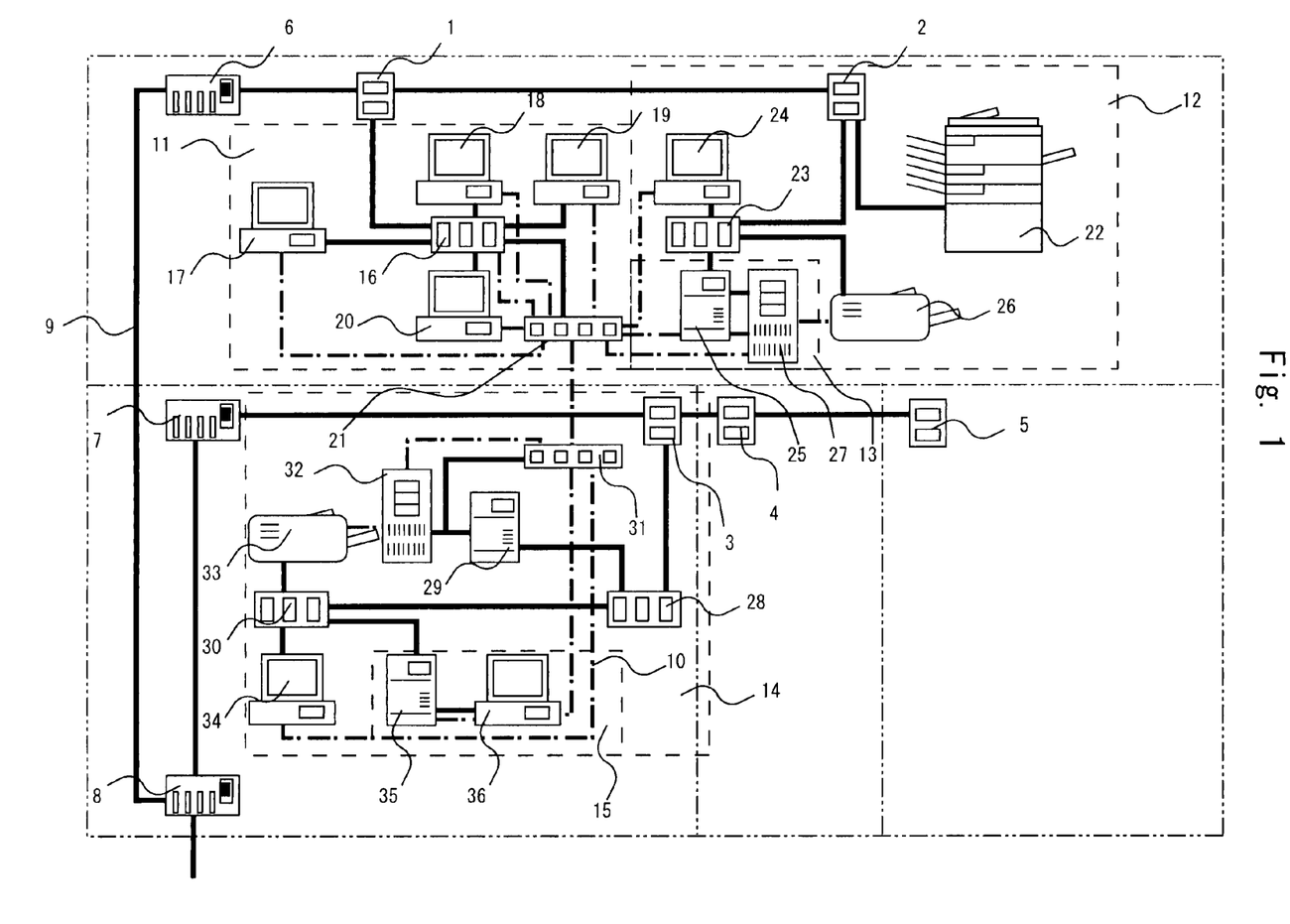
FIG. 1 is a diagram showing an example of wiring layout of a power system, to which a electrical system wiring diagram generating system is applied, according to a first embodiment of the present invention.

FIG. 1 is a diagram showing an example of wiring layout of a power system, to which a electrical system wiring diagram generating system, according to a first embodiment of the present invention, is applied. In the drawing, one or two sockets 1, 2, 3, 4, 5 are mounted on a wall in each of four rooms, which are shown by two-dot chain lines. As shown in the drawing, the respective sockets 1, . . . , 5 are connected to two independent panel boards 6, 7 using electric wires, and the two independent panel boards 6, 7 are connected to a main panel board 8 using electric wires. Further, the main panel board 8 is connected to an external power supply using an electric wire. Power supplied from the power supply is distributed and supplied to the sockets 1, . . . , 5, as power supply equipments, via the main panel board 8 and the independent panel boards 6, 7, as power supply equipments.

It should be noted that, in FIG. 1, thick solid lines indicate power supply lines 9, including the aforesaid electric wires, one-dot chain lines indicate a communication network 10, for transmitting/receiving data between plural electric devices and plural power supply devices, and that broken lines indicate ranges 11, 12, 13, 14, 15, generated as connection data of downstream side of the power system in this embodiment, which will be described later.

Further, identification information is allocated to each of the sockets 1, . . . , 5, to each of independent panel boards 6, 7, and to a main panel board 8, for distinguishing from each other. For example, a serial number, such as a manufacturing number, allocated to each product can be used as the identification information. In this embodiment, identification numbers 1, 2, 3, 4, 5 are allocated to the respective sockets 1, ..., 5, in the order from top left, and also identification numbers 1, 2, 3 are allocated to the respective independent panel boards 6, 7 and to the main panel board 8, in the order from top. When each of the sockets 1, ..., 5 or each of the panel boards 6, ..., 8 needs to be explained as distinguished from each other, in the explanation below, it will be explained with the number.

To the first socket 1, four computer terminals 17, 18, 19, 20, and one communication relay device 21 such as a hub or a router, are connected via an intelligent tap 16.

To the second socket 2, a copy machine 22, and a tap 23 are connected. To the tap 23, a computer terminal 24, an intelligent uninterruptible power supply 25, and a printer 26 are further connected. Furthermore, to the intelligent uninterruptible power supply 25, a communication network server 27 is connected.

All of the computer terminals 17, ..., 20, 24, communication network server 27, intelligent tap 16, and intelligent uninterruptible power supply 25, described above, have their respective communication devices, connected to the communication relay device 21 via the communication network 10, and transmit/receive data to/from each other via the communication relay device 21.

To the third socket 3, a tap 28 is connected. To the tap 28, an uninterruptible power supply 29, and a different tap 30 are further connected. To the uninterruptible power supply 29, a communication relay device 31, and a communication network server 32 are connected. To the different tap 30, a printer 33, a computer terminal 34, and an intelligent uninterruptible power supply 35 are connected. To the intelligent uninterruptible power supply 35, a computer terminal 36 is connected.

The aforesaid plural computer terminals 34, 36, and communication network server 32, connected on the downstream side of the third socket 3 in a power supply direction, have their respective communication devices, connected to the communication relay device 31 via the communication network 10, and transmit/receive data to/from each other, via the communication relay device 31. Further, the two communication relay devices 21, 31 described above, are also connected to each other via the communication network 10, and data can be transmitted/received also between them.

It should be noted that the intelligent uninterruptible power supply 35, on the downstream side, transmits/receives data to/from the computer terminal 36. Further, the printers 26, 33 are connected to the respective communication network servers 27, 32.

As stated above, the communication network 10 is constructed, in the power system of the first embodiment. In such a communication network 10, if power supply to either the communication relay device 21 or 31 is stopped, each of the equipments, connected to the communication relay device 21 or 31, cannot transmit/receive data to/from other equipments.

In the power system as described above, a power system wiring diagram generating program is installed in the computer terminal 36, and a downstream side connection data transmitting program is installed in the computer terminals 24, 34. Hereinafter, the computer terminal 36, in which the electrical system wiring diagram generating program is installed, is referred to as a electrical system wiring diagram generating terminal, and the two computer terminals 24, 34, in which the downstream side connection data transmitting program is installed, are referred to as intelligent terminals.

Figure 2:
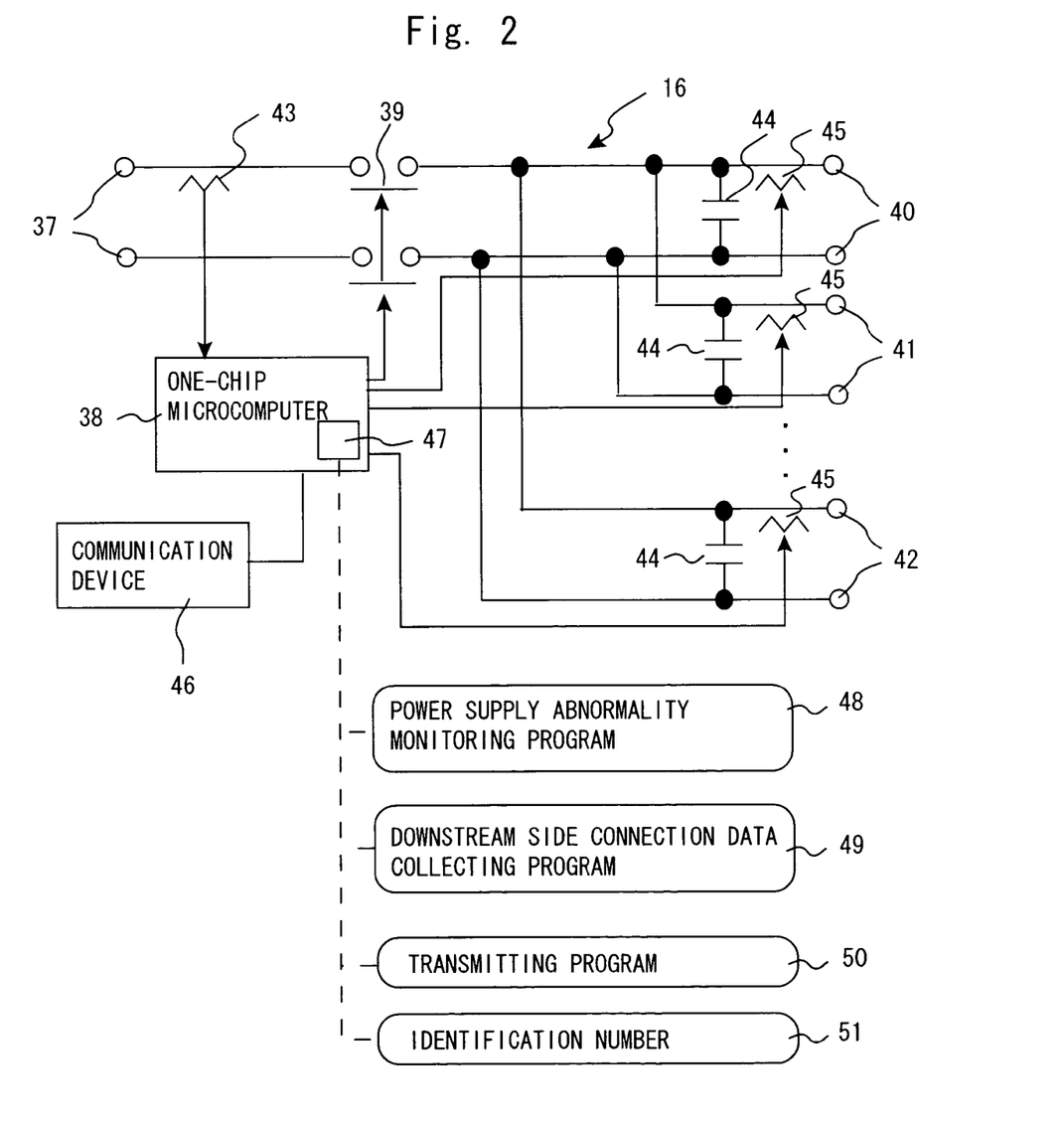
FIG. 2 is a circuit diagram showing a configuration of an intelligent tap shown in FIG. 1.

FIG. 2 is a circuit diagram showing a configuration of the intelligent tap 16, shown in FIG. 1.

A pair of input terminals 37 such as a plug is connected to a switch 39, whose opening/closing is controlled by a one-chip microcomputer 38. Further, internal wires, connected to the other end of the switch 39, are split into plural lines, and each pair of the plural lines connected to each pair of output terminal pairs 40, 41, ..., 42. Furthermore, a detection member 43, for measuring an input current and the like, is arranged between the input terminal pair 37 and the switch 39, and a detection signal of the detection member 43 is inputted to the one-chip microcomputer 38. It should be noted that the switch 39 is closed when power supply is in normal, to electrically connect the input terminal pair 37 and the plural output terminal pairs 40, 41, ..., 42, and that the switch 39 is opened, by the opening control of the one-chip microcomputer 38.

In the intelligent tap 16, particularly, between each pair of the output terminals 40, 41, ..., 42, a capacitor 44 as a low-pass filter is connected; on the each of the power supply lines, between each of the capacitors 44 and each of the output terminal pair 40, 41, ..., or 42, a coil 45 is located, to superimpose a signal from the one-chip microcomputer 38 into the power supply line. Moreover, to the one-chip microcomputer 38, a communication device 46, for transmitting/receiving data under the control thereof, is connected.

In addition, in a memory 47, built in the one-chip microcomputer 38, there are stored a power supply abnormality monitoring program 48 for controlling the switch 39 to open/close, a downstream side connection data collecting program 49, a transmitting program 50, and so on. In the memory 47, there is also stored identification information 51, such as a manufacturing number, which is uniquely allocated to the intelligent tap 16.

The power supply abnormality monitoring program 48 is cyclically executed, by the one-chip microcomputer 38, to realize a power supply abnormality monitoring means, as a trouble detecting means in the intelligent tap 16. The power supply abnormality monitoring means detects in the detection signal, which is detected by itself, and judges the abnormality of the power supply voltage, the power supply current, or the like, and controls the switch 39 to open when the judge is in abnormal.

The downstream side connection data collecting program 49, is executed by the one-chip microcomputer 38, to realize a downstream side connection data collecting means, in the intelligent tap 16. The downstream side connection data collecting means outputs a signal, to each of the output terminal pairs 40, 41, ..., 42 using the coil 45, and, based on a response to the signal, collects information on electric devices, connected on the downstream side of the intelligent tap 16 in the power supply direction, so as to generate connection data of a downstream side of the power system, between the intelligent tap 16 and the electric devices connected thereto, using the electric device information. It should be noted that the signal, outputted to each of the output terminal pairs 40, 41, ..., 42, does not reach other output terminal pairs 40, 41, ..., 42, because the signal is attenuated by the <capacitor 44. Further, if necessary, a capacitor is also connected on the input terminal pair 37 side, between the detection member 43 and the switch 39, so that the signal can be also prevented from reaching its upstream side in the power supply direction.

The transmitting program 50 is executed, by the one-chip microcomputer 38, to realize a transmitting means in the intelligent tap 16. The transmitting means controls the communication device 46, to transmit the connection data of the downstream side of the power system to the communication network 10, together with the identification information 51 stored in the memory 47. Further, when the power supply abnormality monitoring means detects abnormality, the transmitting means transmits the detection information, to the communication network 10.

When power supply abnormality occurs, such an intelligent tap 16 stops its power supplying to the downstream side in its power supply direction, and transmits the notification to the communication network 10. Further, the intelligent tap 16 generates the connection data of the power system on its downstream side, and transmits the connection data to the communication network 10. The intelligent tap 16, according to the first embodiment, generates connecting information of electric devices in the broken line 11, as the connection data of the downstream side of the power system, and transmits the connection data to the communication network 10.

Figure 3:
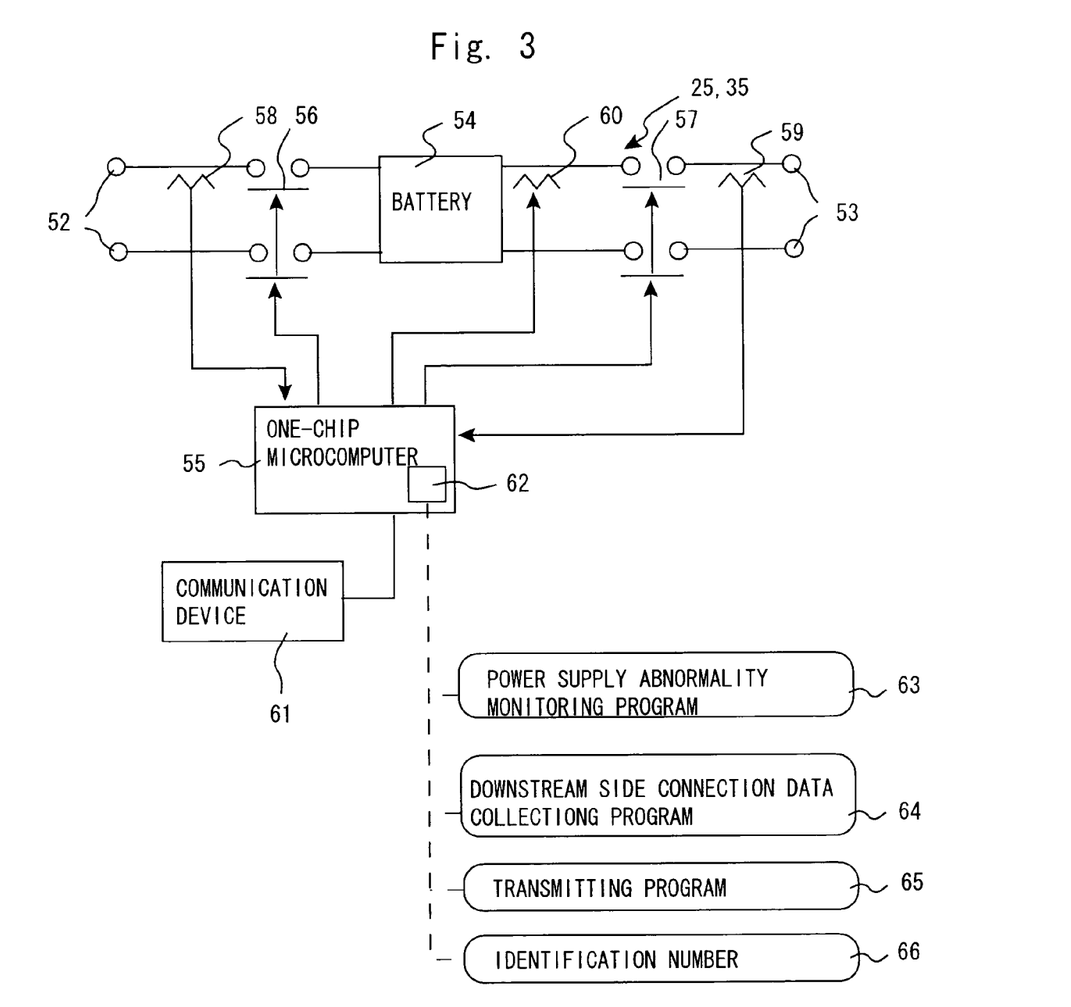
FIG. 3 is a circuit diagram showing a configuration of an intelligent uninterruptible power supply shown in FIG. 1.

FIG. 3 is a circuit diagram showing a configuration of the intelligent uninterruptible power supplies 25, 35, shown in FIG. 1.

A battery 54 is connected, to internal wires, between an input terminal pair 52, such as a plug, and an output terminal pair 53. Between the battery 54 and the terminal pairs 52, 53, switches 56, 57, whose opening/closing is controlled by a one-chip microcomputer 55, are respectively connected. Further, detection members 58, 59 are respectively arranged, for measuring an input/output current, an input/output voltage, and the like, between the input terminal pair 52 and the switch 56, and between the output terminal pair 53 and the switch 57; and the detection signals of the detection members 58, 59 are inputted to the one-chip microcomputer 55. It should be noted that the switches 56, 57 are closed, when power supply is normal, and the input terminal pair 52 and the output terminal pair 53 are electrically connected.

In the intelligent uninterruptible power supplies 25, 35, a coil 60 is arranged, for superimposing a signal from the one-chip microcomputer 55 on the power supply line of the output side. Incidentally, when there are plural output terminal pairs, it is suitable to arrange a coil and a capacitor for each of the output terminal pairs, similarly to the intelligent tap 16. Further, to the one-chip microcomputer 55, a communication device 61 is connected, for transmitting/receiving data under the control thereof.

Furthermore, in a memory 62, built in the one-chip microcomputer 55, there are stored a power supply abnormality monitoring program 63, for controlling the switches 56, 57 to open/close, a downstream side connection data collecting program 64, a transmitting program 65, and so on. In the memory 62, there is also stored identification information 66, such as manufacturing numbers, which is uniquely allocated to the intelligent uninterruptible power supplies 25, 35.

It should be noted that operations, based on these programs 63, 64, . . . , 65, is basically the same as the operations, based on the same named program in the intelligent tap 16; and thus the explanations thereof will be omitted. However, since the capacitor 44 is not arranged, the switch 56 on the input terminal pair side is controlled to open, when the downstream side connection data collecting means outputs a signal to the output terminal pair 53, in order to prevent the signal from reaching its upstream side in the power supply direction.

Such intelligent uninterruptible power supplies 25, 35 switch its supplying power to the battery supply, to the downstream side in the power supply direction, when power supply abnormality occurs; and transmit the notification of it to the communication network 10. Further, the intelligent uninterruptible power supplies 25, 35 generate the connection data of the power systems on its downstream side, and transmit the connection data to the communication network 10. The intelligent uninterruptible power supply 25, according to the first embodiment, generates connecting information of electric devices in the broken line 13, as the connection data of its downstream side of the power system; and transmits the connection data to the communication network 10. On the other hand, the intelligent uninterruptible power supply 35 generates connecting information of electric devices in the broken line 15, as its connection data of the downstream side of the power system; and transmits the connection data to the communication network 10.

Figure 4:
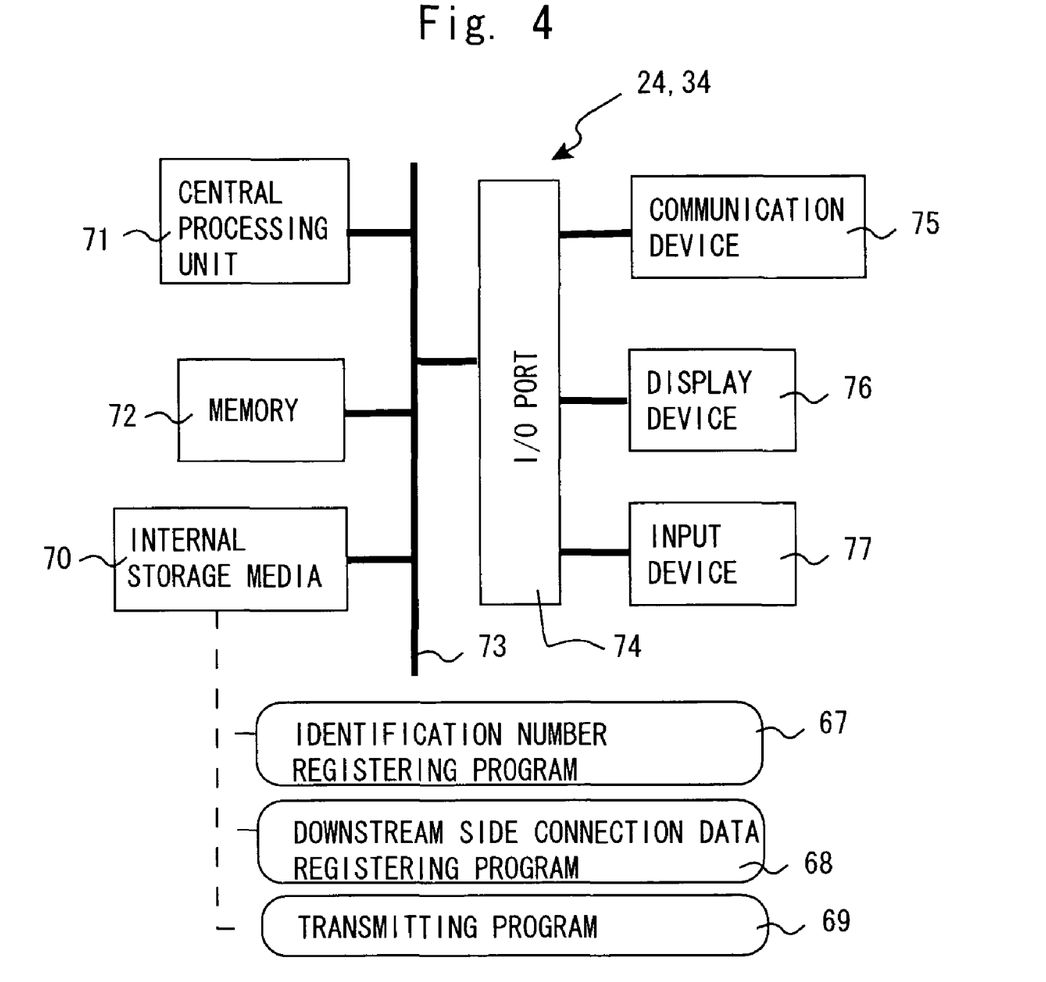
FIG. 4 is a circuit diagram showing a configuration of an intelligent terminal shown in FIG. 1.

FIG. 4 is a circuit diagram showing a configuration of the intelligent terminals 24, 34, shown in FIG. 1.

Each of the intelligent terminals 24, 34 includes, an internal storage medium 70, such as a so-called hard disk, for storing an identification information registering program 67, a downstream side connection data registering program 68, a transmitting program 69, and so on; a central processing unit 71 for executing the programs; a memory 72 for tentatively storing data and the like for the programs being executed; and a system bus 73 for connecting these items to each other. Further, there are connected to the system bus 73, via an I/O port 74, a communication device 75, a display device 76, an input device 77, and so on.

The identification information registering program 67 is executed, by the central processing unit 71, to realize an identification information registering means, in the intelligent terminal 24 or 34. The identification information registering means stores information, which is inputted from the input device 77 while a predetermined registration screen is displayed on the display device 76, in the internal storage medium 70, as identification information of a reference power supply equipment.

It should be noted that any of the equipment could be the reference power supply equipment, which is selected from the panel boards 6, 7, . . . , 8, sockets 1, . . . , 5, table taps 16, 23, 28, 30, and uninterruptible power supplies 25, 32, 35, which is connected between a commercial power supply and the electric devices. In this embodiment, the third socket 3 is registered as a reference power supply equipment in the intelligent terminal 34, and the second socket 2 is registered as a reference power supply equipment in the intelligent terminal 24.

The downstream side connection data registering program 68 is executed, by the central processing unit 71, to realize a downstream side connection data registering means in the intelligent terminal 24 or 34. The downstream side connection data registering means stores information, which is inputted from the input device 77 while a predetermined registration screen is displayed on the display device 76, in the internal storage medium 70, as connection data of a power system on the downstream side of the reference power supply equipment in the power supply direction.

It should be noted that operations, based on the transmitting program 69, is basically the same as the operations, based on the same named program in the intelligent tap 16; and thus the explanations thereof will be omitted. Further, when the intelligent terminal 24 or 34 is connected to an uninterruptible power supply and the like, having a power supply abnormality notification function, a power supply abnormality monitoring program may be additionally installed in the internal storage medium 70, and the notification of the power supply abnormality is transmitted to the communication network 10.

Each of such intelligent terminals 24, 34 generates identification information of a predetermined power supply equipment, and the connection data of the power system on the downstream side of the predetermined power supply equipment in the power supply direction, and transmit them to the communication network 10. The intelligent terminal 24, according to the first embodiment, generates connecting information of electric devices in the broken line 12, as the connection data of the downstream side of the power system; and transmits the connection data to the communication network 10. On the other hand, the intelligent terminal 34 generates connecting information of electric devices in the broken line 14, as the connection data of the downstream side of the power system; and transmits the connection data to the communication network 10.

Figure 5:
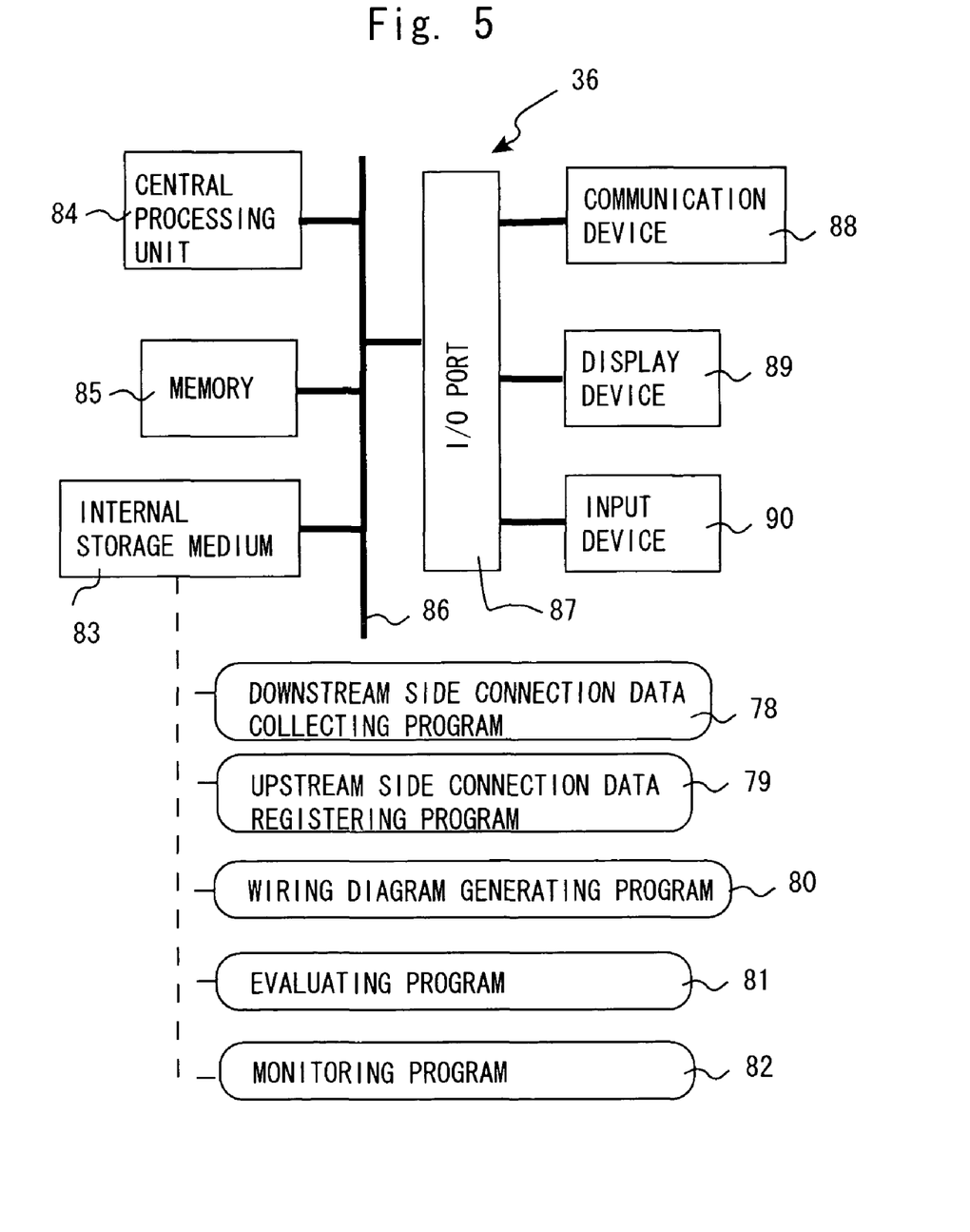
FIG. 5 is a circuit diagram showing a configuration of a power system wiring diagram generating terminal shown in FIG. 1.

FIG. 5 is a circuit diagram showing a configuration of the electrical system wiring diagram generating terminal 36 shown in FIG. 1.

The electrical system wiring diagram generating terminal 36 includes, an internal storage medium 83, such as a so-called hard disk, for storing a downstream side information collecting program 78, an upstream side connection data registering program 79, a wiring diagram generating program 80, an evaluating program 81, a monitoring program 82, and so on; a central processing unit 84 for executing these programs; a memory 85 for tentatively storing data and the like in executing the programs; and a system bus 86 for connecting these items to each other. Further, there are connected to the system bus 86, via an I/O port 87, a communication device 88, a display device 89, an input device 90, and so on.

The downstream side information collecting program 78 is executed, by the central processing unit 84, to realize a downstream side information collecting means, as a receiving means, in the electrical system wiring diagram generating terminal 36. The downstream side information collecting means makes the intelligent tap 16, intelligent uninterruptible power supplies 25, 35, and intelligent terminals 24, 34, connected to the communication network 10, transmit there connection data of there downstream side of the power systems; for example, by polling or the like.

The upstream side connection data registering program 79 is executed, by the central processing unit 84, to realize an upstream side connection data registering means, in the electrical system wiring diagram generating terminal 36. The upstream side connection data registering means stores information, which is inputted from the input device 90 while a predetermined registration screen is displayed on the display device 89, in the internal storage medium 83, as connection data of the upstream side. Practically, there should be registered, at least connecting information between the power supply equipment, which does not exist in any of the connection data of the aforesaid plural downstream side of the power systems, and other power supply equipments described above, as connection data of an upstream side power system; and the identification information of the power supply equipment, which is uniquely allocated to the power supply equipment.

The wiring diagram generating program 80 is executed, by the central processing unit 84, to realize a wiring diagram generating means, in the electrical system wiring diagram generating terminal 36. The wiring diagram generating means generates a wiring diagram of the power system, just by connecting to the connection data of the upstream side of the power system and the connection data of the plural downstream side of the power systems, based on the identification information, which is uniquely allocated to each of the power supply equipments.

Practically, for example, The wiring diagram generating means, at first, generates a wiring diagram of the upstream side of the power system, based on the connection data of the upstream side of the power system and the identification information, which is uniquely allocated to each of the power supply equipments; and plural wiring diagram of the downstream side of the power systems, based on the connection data of the downstream side of the power system and the identification information, which is uniquely allocated to each of the power supply equipments. At second, the wiring diagram generating means generates the wiring diagram of the power system, to connect the wiring diagram of the upstream side of the power system and plural wiring diagram of the downstream side of the power systems, by finding out the identification information, which is included in both of the wiring diagram of the upstream side of the power system and each of the wiring diagram of the downstream side of the power systems.

There is another practical example for generating a wiring diagram of the power system; in that, the connection data of the upstream side of the power system and the connection data of the plural downstream side of the power systems are included in one list, and then generating a wiring diagram of the power system, according to the identification information, which is uniquely allocated to each of said power supply equipments. This another practical example has the following advantages as compared with the former practical example.

First, as shown in FIG. 1, in case each of the intelligent uninterruptible power supplies 25, 35 and equipments operated thereby are registered in each of the intelligent terminals 24, 34, there are redundantly registered connecting information between each of the intelligent uninterruptible power supplies 25, 35 and the device 27 or 36 operated thereby. And in the former example, there is some possibility left not to generate an appropriate wiring diagram of the power system, because plural wiring diagram of the downstream side of the power systems are generated from each of the redundantly registered connecting information; while, in the latter example, by sorting the list and checking redundantly registered information to deleting the redundant connection information, there can be generated an appropriate wiring diagram of the power system.

Secondly, in case one of connecting information of the power supply equipment is not properly registered in both of the connecting data of the downstream side of the power system and the connection data of the upstream side of the power system, in the former example, there is some possibility left not to generate an wiring diagram of the power system, because it is unable to connect the wiring data of the downstream side of the power system to the wiring data of the upstream side of the power system; while, in the latter example, there can be generated an wiring diagram of the power system, which is clearly displayed as obvious error, just by making it as a rule to separate these unconnected wiring diagrams, or to connect one of unconnected wiring diagram to another at the predetermined position; and that makes it possible to register in addition the connecting information in order to generate an appropriate wiring diagram of the power system.

The evaluating program 81 is executed, by the central processing unit 84, to realize an evaluating means, in the electrical system wiring diagram generating terminal 36. The evaluating means evaluates the power system, based on the connecting relationship between the power supply equipments and the electric devices in the wiring diagram of the power system. Practically, for example, the evaluating means integrates rated power consumptions of the electric devices; and compares the integrated power consumptions with the rated power of the uninterruptible power supply 25, 32, or 35, or with the interrupting power of the independent panel board 6 or 7 or the main panel board 8; and make the display device 89 display the notification of the excess of the integrated power as a warning.

The monitoring program 82 is executed, by the central processing unit 84, to realize a monitoring means, in the electrical system wiring diagram generating terminal 36. The monitoring means make the display device 89 display the wiring diagram of the power system; and make the display of the device in the displayed wiring diagram flash in reverse, when the communication device 88 receives a notification of abnormality detection from the intelligent tap 16, the intelligent uninterruptible power supply 25 or 35, or the intelligent terminal 24 or 34.

Incidentally, to display the wiring diagram for monitoring, it is preferred to display the wiring diagram, for example, in which each of the display objects of the devices is laid on a bitmap, in which power supply lines are described. This makes it possible to select each of the display objects of the devices, and to display various kinds of linked information, such as the state of the power consumption of the selected device and so on.

Figure 6:
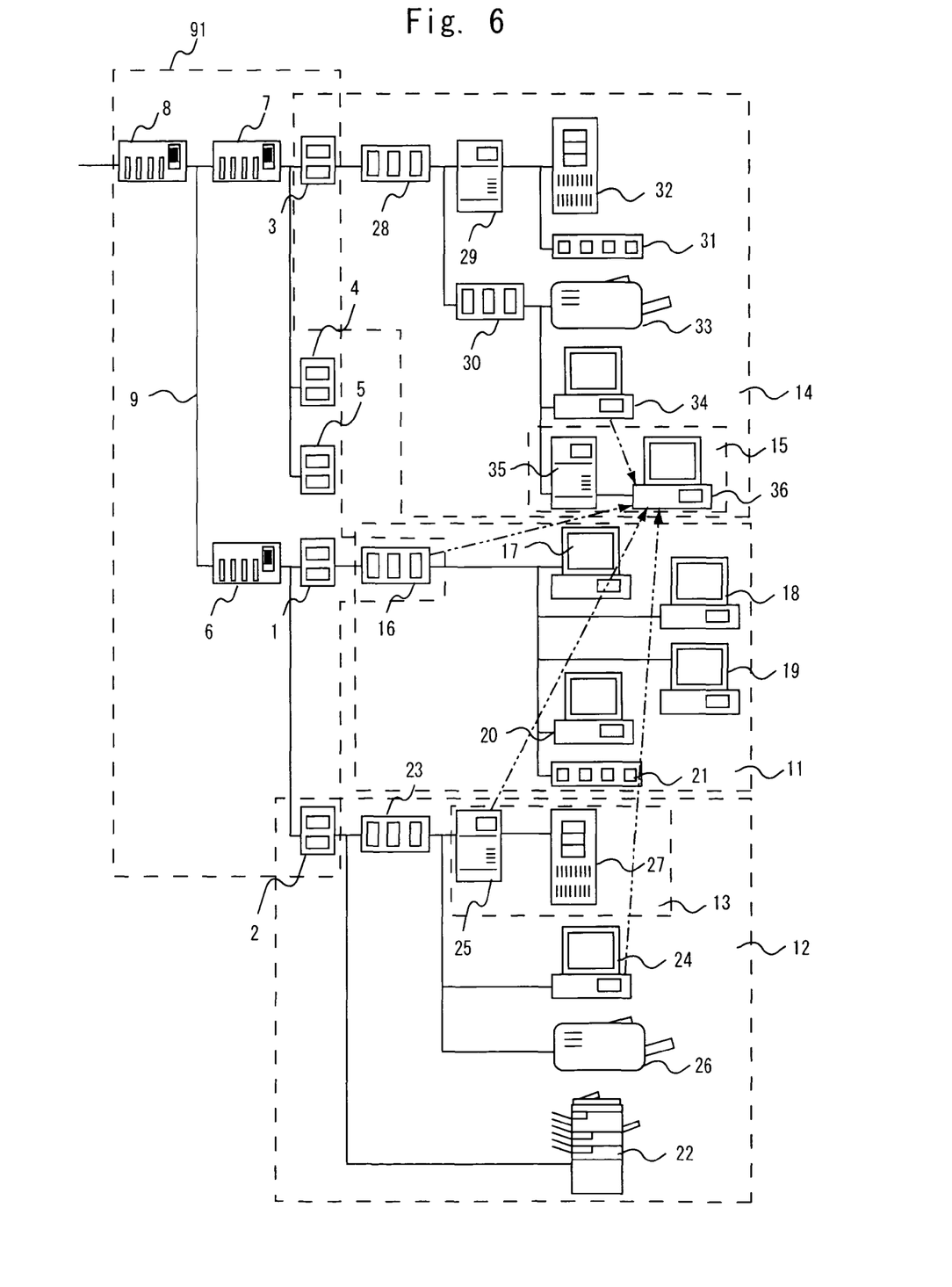
FIG. 6 is a power system wiring diagram of the power system shown in FIG. 1.

Such a electrical system wiring diagram generating terminal 36 generates a wiring diagram of the power system, based on the connection data of the plural downstream side of the power systems and the connection data of the upstream side of the power system; displays the wiring diagram; and makes it possible to monitor the power system. The wiring diagram of the power system of the first embodiment is generated as shown in FIG. 6. It should be noted that each of two-dot lines in the drawing indicates each of transmitting relationships of the connection data of the downstream side of the power system; and that the numeral 91 indicates a range to be registered as the upstream side of the power system. Incidentally, the range may be changed as to include other power supply equipment and the like, and these power supply equipments may be registered as it.

Subsequently, operation of the whole power system wiring diagram generating system will be explained.

As shown in FIG. 1, one-chip microcomputers 38, 55 of the intelligent tap 16 and the intelligent uninterruptible power supplies 25, 35 start monitoring power supply, and output signals from the output terminal pairs 40, 41, . . . , 42, 53, to obtain manufacturing numbers, serial numbers, or the like of the devices connected to the output terminal pairs 40, 41, . . . , 42, 53, if these are connected to the socket 1 and so on. Then, they generate the connection data of the downstream side of the power system, by putting the collected connection data up together. The connection data of the downstream side of the power system may be structured as records, in which the numbers applied to each of the output terminal pairs and the identification numbers of the equipments connected thereto.

The identification information registering program 67 and the downstream side connection data registering program 68 are executed, in each of the intelligent terminals 24, 34; and in each of the internal storage medium 70 of them, there are stored the reference power supply equipment (in this embodiment, the second socket 2 or the third socket 3), and the connection data of downstream side of the power system, related to the equipments which are connected on the downstream side of the reference power supply equipment in the power supply system.

Further, the upstream side connection data registering program 79 is executed, in the electrical system wiring diagram generating terminal 36; and the connection data of the upstream side of the power system is registered in the internal storage medium 83 thereof. Incidentally, the connection data of the upstream side of the power system may be structured as records, including the main panel board 8 as an upstream side device of it and the two independent panel boards 6, 7 as downstream side devices of it.

And in the state, in which the connection data of the upstream side of the power system and the connection data of the plural downstream side of the power systems have been generated in the respective devices 16, 24, 25, 34, 35, 36, and in which the downstream side information collecting program 78 is executed in the electrical system wiring diagram generating terminal 36; t the intelligent tap 16, the intelligent uninterruptible power supplies 25, 35, and the intelligent terminals 24, 34 transmit their own connection data of their respective downstream side of the power system, to the electrical system wiring diagram generating terminal 36, via the communication network 10, in response to sequential call by polling.

After the electrical system wiring diagram generating terminal 36 receives the connection data of the plural downstream side of the power systems, it records the connection data in the internal storage medium 83, and executes the wiring diagram generating program 80. As a result, a wiring diagram of the power system is generated, based on the previously-registered connecting data of the upstream side of the power system and the received connecting data of the plural downstream side of the power systems; and is recorded in the internal storage medium 83.

After the wiring diagram of the power system is generated, the evaluating program 81 is executed, the display device 89 displays the problem of power supply, which is analyzed on the wiring diagram of the power system. With the problem information, a user can analyze trouble of the power supply system, give preventive maintenance against trouble, properly enhance the power supply equipments according to connecting states of the electric devices, and the like.

Further, after generating the wiring diagram of the power system, the monitoring program 82 is executed, the display device 89 displays the information of an equipment in trouble, which is superimposed on a wiring diagram of the power system. As a result, even in case the communication network 10 is in abnormal because of the abnormality of the power supply, it is easy to understood the original cause, just by referring to a communication network wiring diagram and so on.

As stated above, according to the first embodiment, the wiring diagram of the power system is easily generated. Moreover, even in case connection of the electric devices to the power supply are changed, or that a new electric device is added, a new wiring diagram of the power system is easily generated, according to the change or addition.

For example, since the connecting information of each of the electric devices to the power system can be locally registered, by the dividing unit of the socket 1, . . . , or 5 or the panel board 6 or 7, just by registering the connecting information, as confirming, one by one at the location, the connecting state of each of the electric devices in the power supply system, the registration of each of the electric devices is done easily. On the other hand, since there is little possibility to change the connecting information of the panel board 8 or the like, which is located in the upstream side of the power system, the registration of these power supply equipments is usually done at the installation time, using the electrical system wiring diagram generating terminal 36. Accordingly, the electrical system wiring diagram generating system generates a wiring diagram of the power system, according to the actual connection in the power system, just by being renewed the registered connecting information of the downstream side of the socket 1, . . . , or 5 or the panel board 6 or 7, even though the whole connection of the power system is managed continuously.

As a result, it is easy to check the position, where electric power seems to become insufficient or the like, at the time when the connection of the electric devices is changed, or a new electric device is connected in the power system. Therefore, it is possible to analyze the trouble of the power supply system, prevent trouble and maintenance, enhance the power supply equipments properly according to the connection of the electric devices, and the like.

Further, it is easy to find out a router and the like, which is not backed up its power by an uninterruptible power supply, and to check the operating state of a communication network 10 under an abnormal condition of the power supply, for example, with a reference to a wiring diagram of the communication network 10 or the like, and that enables to operate the communication network 10, with minimizing the influence from the trouble of the power supply system.

The embodiment described above is a preferable embodiment of the present invention, and various kinds of modification are possible without departing from the purpose of the present invention. For example, the information from the input device 77 is registered as the connection data of the downstream side of the power system in the intelligent terminals 24, 34 in the embodiment described above, but the connection data may be automatically collected from, for example, the reference power supply device. On the contrary, the connection data of the downstream side of the power systems is automatically collected in the intelligent tap 16 and in the intelligent uninterruptible power supplies 25, 35, but input/output devices may be provided to register the connection data.

Further, the electrical system wiring diagram generating terminal 36 collects the connection data of the downstream side of the power system using the existing communication network 10 in the embodiment described above, but it may collect the connection data using the power supply lines. Furthermore, the evaluating program 81 and the monitoring program 82 are executed in the electrical system wiring diagram generating terminal 36, but they may be executed in a different terminal.

INDUSTRIAL AVAILABILITY

As stated above, using a power system wiring diagram generating system according to the present invention and a power supply device and a program used for the same, a wiring diagram of a power system is easily generated, even if the connecting state of electric device to a power supply are changed in the power system, and with the wiring diagram of the power system, it is easy to analyze trouble of the power supply system, give preventive maintenance against trouble, properly enhance power supply equipments according to the connecting states of the electric devices, and the like.

The invention claimed is:

1. A electrical system wiring diagram generating system by using a computer, for generating a wiring diagram of a power system related to a plurality of electric devices, which are connected to a power supply via a plurality of power supply equipment arranged in said power system, said electrical system wiring diagram generating system comprising:

a plurality of downstream side connection data generating means which generates connection data of a downstream side of said power system between the power supply equipment that are in the downstream side of power supply equipment that are capable of obtaining downstream side connection data to which said electric devices are directly connected, each of which generates connection data of downstream side of said power system between the power supply equipment with which downstream side connection data generating means is provided and said electric devices connected thereto; each downstream side connection data generating means being comprised of a processor;

a plurality of transmitting means, provided at power supply equipment that are capable of obtaining downstream side connection data; each of which transmits connection data of the downstream side of said power system, together with the identification information, which is uniquely allocated to each of said selected power supply equipment and the power supply equipment that are in the downstream side of said selected power supply equipment receiving means, for receiving said information transmitted from said plurality of transmitting means;

an upstream side connection data generating means, for generating connection data of, a certain number of said plurality of power supply equipments as the connection data of upstream side of said power system, which does not exist in any of said connection data of the downstream side of said power system, and of said selected power supply equipment associated with identification information, which is uniquely allocated to each of said power supply equipments, of each of said power supply equipments; and a wiring diagram generating means, which generates and displays a wiring diagram of said power system that shows the electrical connection hierarchy, from said connection data of upstream side of said power system and said connection data of downstream side of said power systems, based on said identification information of said selected power supply equipment and the others of said power supply equipments a communication network for transmitting/receiving data between above each said means.

2. The electrical system wiring diagram generating system by using a computer, for generating a wiring diagram of a power system related to a plurality of electric devices, which are connected to a power supply via power supply equipments, such as panel boards, sockets, table taps, or uninterruptible power supplies, arranged in said power system, said electrical system wiring diagram generating system comprising:

a plurality of downstream connection data generating means which generates connection data of downstream side of said power system between the power supply equipment that are in the downstream side of a selected power supply equipment and said electric devices connected thereto; each downstream side connection data generating means being comprised of a processor;

a plurality of transmitting means, each of which transmits said each of said connection data of the downstream side of said power system, together with the identification information, which is uniquely allocated to each of said selected power supply equipment and the power supply equipment that are in the downstream side of said selected power supply equipment, receiving means, for receiving said information transmitted from said plural transmitting means; an upstream side connection data generating means for generating connection data, as the connection data of upstream side of said power system, of at least said power supply equipments, which does not exist in any of said connection data of the downstream side of said power system, and of said selected power supply equipment, associated with identification information, which is uniquely allocated to each of said power supply equipments, of each of said power supply equipments;

a wiring diagram generating means, which generates and displays a wiring diagram of said power system that shows the electrical connection hierarchy, from one list including said connection data of upstream side of said power system and plurality of said connection data of the downstream side of said power systems, according to said identification information: and a communication network for transmitting/receiving data between above each means.

3. The electrical system wiring diagram generating system according to claim 1, further comprising:

a trouble detecting means, for detecting trouble in said power system; and a display means, for displaying said wiring diagram of said power system and the position of said trouble having occurred.

4. The electrical system wiring diagram generating system according to claim 1, further comprising an evaluating means, for evaluating said power system, based on the connection relationship between said power supply equipments and said electric devices, which exist in said wiring diagram of said power system.

5. A computer program product, which is executed in a computer, which is connected to a power supply via power supply equipments, arranged in a power system, said computer program product comprising, being collaborated with a central processing unit of said computer:

a downstream side connection data generating means, for generating connection data of downstream side of said power system between the selected power supply equipment, to which said computer is directly connected, or which is connected on the upstream side of said power supply equipment to which said computer is directly connected, and electric devices connected thereto; said downstream side connection data generating means comprising of a processor and a transmitting means, for transmitting said connection data of the downstream side of said power system, together with the identification information, which is uniquely allocated to said selected power supply equipment to be stored in a memory.

6. A power supply device, arranged in a power system between a power supply and electric devices, for supplying power supplied from said power supply to said electric devices, said power supply device comprising:

a storage means, for storing identification information, which is uniquely allocated to said power supply device;

a downstream side connection data generating means, for generating connection data of downstream side of said power system between said power supply device and said electric devices connected thereto; said downstream side connection data generating means being comprised of a processor; and a transmitting means, for transmitting the connection data of downstream side of said power system, together with said identification information to be stored in a memory.

7. The electrical system wiring diagram generating system according to claim 2, further comprising: a trouble detecting means, for detecting trouble in said power system; and a display means, for displaying said wiring diagram of said power system and the position of said trouble having occurred.

8. The electrical system wiring diagram generating system according to claim 2, further comprising:

an evaluating means, for evaluating said power system, based on the connection relationship between said power supply equipments and said electric devices, which exist in said wiring diagram of said power system.

* * * * *